United States Patent
Anandhan et al.

(10) Patent No.: US 11,856,056 B2
(45) Date of Patent: Dec. 26, 2023

(54) SYSTEM AND METHOD FOR DECENTRALIZED NOTIFICATION SERVICES

(71) Applicant: JPMORGAN CHASE BANK, N.A., New York, NY (US)

(72) Inventors: Ramesh Babu Anandhan, Princeton Junction, NJ (US); Chang Yang Jiao, New York, NY (US); Sudhir Upadhyay, Edison, NJ (US); Thomas Eapen, Jersey City, NJ (US); Tulasi Movva, Trumbull, CT (US); Suresh Shetty, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 44 days.

(21) Appl. No.: 17/650,195

(22) Filed: Feb. 7, 2022

(65) Prior Publication Data

US 2023/0179654 A1    Jun. 8, 2023

(30) Foreign Application Priority Data

Nov. 9, 2021 (IN) .............................. 202111051261

(51) Int. Cl.
*H04L 67/104* (2022.01)
(52) U.S. Cl.
CPC ................................. *H04L 67/104* (2013.01)
(58) Field of Classification Search
CPC ....... H04L 67/104; H04L 67/56; H04L 67/55; H04L 67/12
USPC .......................................................... 709/217
See application file for complete search history.

(56) References Cited

U.S. PATENT DOCUMENTS

2021/0065317 A1 * 3/2021 Cali ..................... G06Q 20/145

FOREIGN PATENT DOCUMENTS

WO         2014149928       9/2014
WO    WO-2014149928 A1 *  9/2014    ......... H04L 67/1068

OTHER PUBLICATIONS

International Search Report, dated Jun. 27, 2022, from corresponding International Application No. PCT/US2022/070587.
Written Opinion of the International Searching Authority, PCT/US2022/070587.

* cited by examiner

*Primary Examiner* — Glenford J Madamba
(74) *Attorney, Agent, or Firm* — GREENBERG TRAURIG LLP (57) ABSTRACT

Systems, methods, and devices for decentralized notification services are disclosed. In some aspects, the techniques described herein relate to: providing a distributed notification service configured to execute on each node of a plurality of nodes of a decentralized peer-to-peer platform; determining, by the distributed notification service of a first node, a notification definition, where the notification definition is from a catalog of notification definitions and included in a distributed application executing on the first node; sending, by the distributed notification service of a second node, a notification message, where the notification message is associated with the notification definition; receiving, by the distributed notification service of the first node, the notification message; and delivering, by the distributed notification service of the first node, the notification message in the distributed application executing on the first node.

20 Claims, 3 Drawing Sheets

SYSTEM AND METHOD FOR DECENTRALIZED NOTIFICATION SERVICES

RELATED APPLICATIONS

This application claims priority to, and the benefit of, Indian Patent Application Ser. No. 202111051261, filed Nov. 9, 2021, the disclosure of which is hereby incorporated, by reference, in its entirety.

BACKGROUND

1. Field of the Invention

Embodiments relate generally to systems and methods for implementing notification services on a distributed peer-to-peer platform.

2. Description of the Related Art

Conventional notification services are centralized. A central server services clients by processing and sending notifications to the clients in a traditional client/server environment. Technical challenges exist, however, implementing notification services on a decentralized, distributed peer-to-peer platform where nodes are autonomous and centralized servers are not available.

SUMMARY

In some aspects, the techniques described herein relate to a method including: providing a distributed notification service configured to execute on each node of a plurality of nodes of a decentralized peer-to-peer platform; determining, by the distributed notification service of a first node of the plurality of nodes, a notification definition, wherein the notification definition is from a catalog of notification definitions and included in a distributed application executing on the first node of the plurality of nodes; sending, by the distributed notification service of a second node of the plurality of nodes, a notification message, wherein the notification message is associated with the notification definition; receiving, by the distributed notification service of the first node of the plurality of nodes, the notification message; and delivering, by the distributed notification service of the first node of the plurality of nodes, the notification message in the distributed application executing on the first node of the plurality of nodes through a channel defined at a network level of the decentralized peer-to-peer platform.

In some aspects, the techniques described herein relate to a method, wherein the notification definition conforms to a parameter template defined at the network level of the decentralized peer-to-peer platform.

In some aspects, the techniques described herein relate to a method, wherein the parameter template includes one of a notification title, a name of a distributed application the notification message is being defined for, and a notification message identifier.

In some aspects, the techniques described herein relate to a method, wherein the channel is one of an electronic mail delivery and an activity feed delivery.

In some aspects, the techniques described herein relate to a method, wherein the notification definition is determined based on a user selection from the catalog of notification definitions.

In some aspects, the techniques described herein relate to a method, wherein the notification message is delivered to the channel based on a user selection of the channel.

In some aspects, the techniques described herein relate to a method, wherein the distributed application is a platform level application.

In some aspects, the techniques described herein relate to a method, wherein the distributed application is distributed from a platform operator to each node of the decentralized peer-to-peer platform.

In some aspects, the techniques described herein relate to a method, wherein the notification message is a system level notification message.

In some aspects, the techniques described herein relate to a method, wherein the decentralized peer-to-peer platform operates on a distributed ledger platform including a distributed ledger protocol.

In some aspects, the techniques described herein relate to a system for notification delivery on a decentralized peer-to-peer platform including: a distributed notification service configured to execute on each node of a plurality of nodes of the decentralized peer-to-peer platform, wherein: a first instance of the distributed notification service determines a notification definition, wherein the notification definition is from a catalog of notification definitions included in a distributed application executing on a first node of the plurality of nodes; a second instance of the distributed notification service sends a notification message, wherein the notification message is associated with the notification definition; the first instance of the distributed notification service receives the notification message; and the first instance of the distributed notification service delivers the notification message in the distributed application executing on the first node of the plurality of nodes through a channel defined at a network level of the decentralized peer-to-peer platform.

In some aspects, the techniques described herein relate to a non-transitory computer readable storage medium, including instructions stored thereon for delivering a notification on a decentralized peer-to-peer platform, which when read and executed by one or more computers cause the one or more computers to perform steps including: determining, by a distributed notification service of a first node of a plurality of nodes of the decentralized peer-to-peer platform, a notification definition, wherein the notification definition is from a catalog of notification definitions and included in a distributed application executing on the first node of the plurality of nodes; sending, by the distributed notification service of a second node of the plurality of nodes, a notification message, wherein the notification message is associated with the notification definition; receiving, by the distributed notification service of the first node of the plurality of nodes, the notification message; and delivering, by the distributed notification service of the first node of the plurality of nodes, the notification message in the distributed application executing on the first node of the plurality of nodes through a channel defined at a network level of the decentralized peer-to-peer platform.

In some aspects, the techniques described herein relate to a non-transitory computer readable storage medium, wherein the notification definition conforms to a parameter template defined at the network level of the decentralized peer-to-peer platform.

In some aspects, the techniques described herein relate to a non-transitory computer readable storage medium, wherein the parameter template includes one of a notification title, a name of a distributed application the notification is being defined for, and a notification message identifier.

In some aspects, the techniques described herein relate to a non-transitory computer readable storage medium, wherein the channel is one of an electronic mail delivery and an activity feed delivery.

In some aspects, the techniques described herein relate to a non-transitory computer readable storage medium, wherein the notification definition is determined based on a user selection from the catalog of notification definitions.

In some aspects, the techniques described herein relate to a non-transitory computer readable storage medium, wherein the notification message is delivered to the channel based on a user selection of the channel.

In some aspects, the techniques described herein relate to a non-transitory computer readable storage medium, wherein the distributed application is a platform level application.

In some aspects, the techniques described herein relate to a non-transitory computer readable storage medium, wherein the distributed application is distributed from a platform operator to each node of the decentralized peer-to-peer platform.

In some aspects, the techniques described herein relate to a non-transitory computer readable storage medium, wherein the decentralized peer-to-peer platform operates on a distributed ledger platform including a distributed ledger protocol.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF EMBODIMENTS

Embodiments relate generally to systems and methods for implementing notification services on a distributed peer-to-peer platform.

In embodiments, a decentralized peer-to-peer (P2P) network is a collection of participants that are connected via a P2P protocol. P2P networks have no centralized service or hierarchy. Each node in a P2P network is a "peer" in the sense that it is equal to every other node in the network. Every node in the network shares the responsibility of providing services to the network. Each node is an equal and active consumer, contributor, and collaborator ("3C") of services and applications on the network. The growth of the network has a network effect for contributors on the network.

Figure 1:
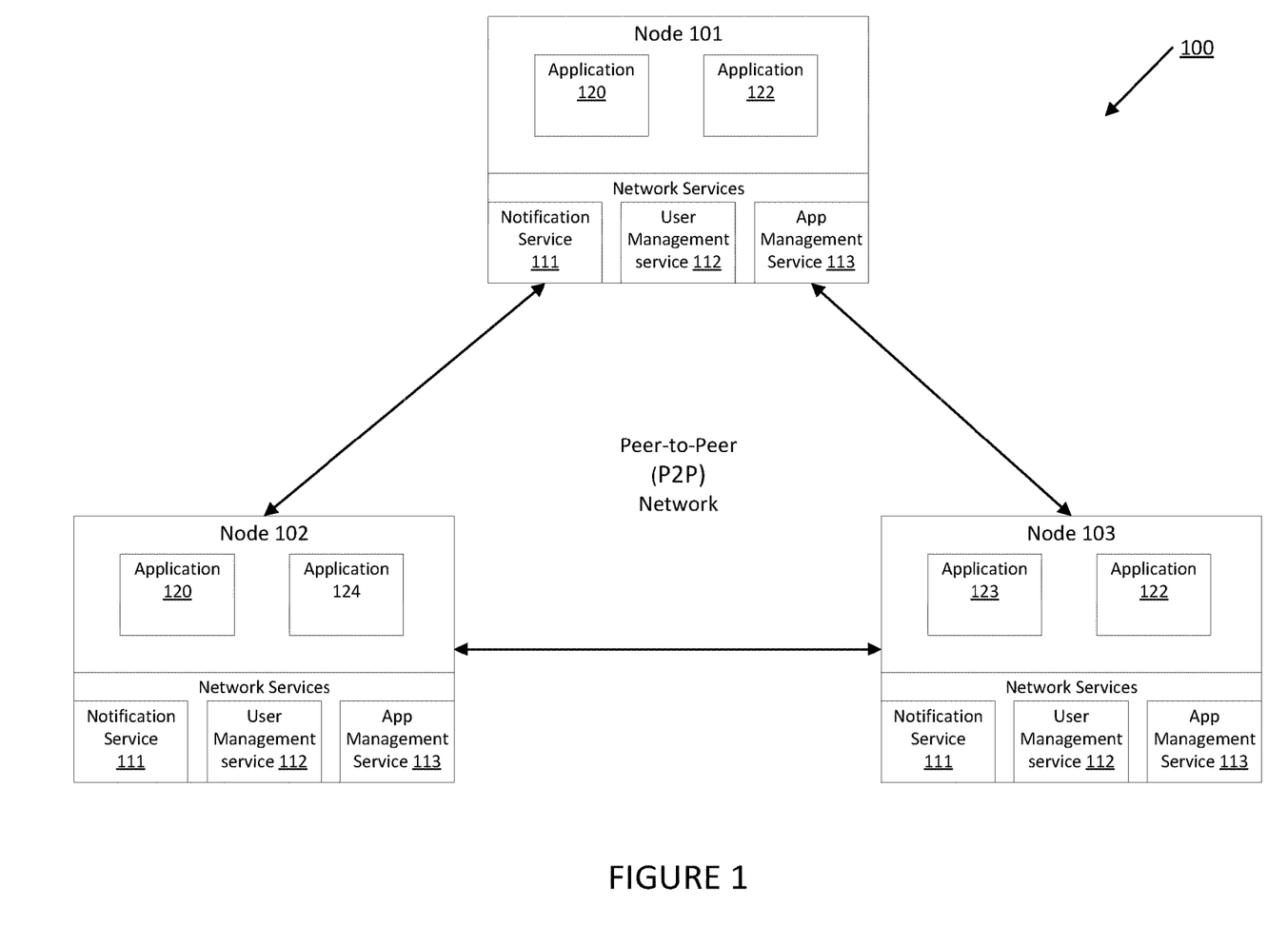
FIG. 1 is a block diagram of a decentralized peer-to-peer network system, in accordance with embodiments.

Referring to FIG. 1, shown is a block diagram of a decentralized P2P network, in accordance with embodiments. P2P network 100 is decentralized. For example, P2P network has no centralized service nor hierarchy. P2P network includes node 101, 102, and 103. A P2P node may be embodied in one or more computers, servers, or other processing machines, as described herein. Participants in a P2P network may interact via network nodes, such as nodes 101, 102, and 103. Although only three nodes (node 101, node 102, and node 103) are illustrated in FIG. 1, it is contemplated that any number of nodes, as is necessary and/or desired, may participate in P2P network 100.

In accordance with embodiments, a P2P network may operate as, or on top of, a platform where each node includes network level services. Network level services and/or applications may include services that the node executes to be considered a node of the P2P network. That is, certain network level services may define membership in the P2P network. The P2P network may have a network operator that defines, designs, builds, and/or distributes network level services and applications.

P2P network 100 may be a permissioned network, and the participants may permission other peers to interact with any service or distributed application in use on the network.

In one embodiment, P2P network 100 may be a distributed ledger network, or may be built on a distributed ledger platform, such as a blockchain based network. P2P network may use a P2P protocol that is a distributed ledger or blockchain protocol for communication between nodes. An example of such a network is disclosed in U.S. patent application Ser. No. 16/015,709, filed Jun. 22, 2018, the disclosure of which is hereby incorporated, by reference, in its entirety.

Nodes 101, 102, and 103 of FIG. 1 are each depicted having a suite of network level services. In accordance with embodiments, each node is shown having notification service 111, user management service 112, and application ("app") management service 113. These network level services are exemplary, and more, less, or other network level services and applications may be included as part of a P2P network platform in accordance with embodiments.

With continued reference to FIG. 1, nodes 101, 102, and 103 may execute applications, which may be distributed applications, in accordance with embodiments. Applications 120, 121, 122, 123, and 124 may be network applications that communicate over a P2P network protocol. Applications 120, 121, 122, 123, and 124 may be network level applications, i.e., they may be defined, designed, built and/or distributed by the network operator as part of the network platform. Alternatively, Applications 120, 121, 122, 123, and 124 may be defined, designed, built and/or distributed by participants having nodes on the P2P network.

In one embodiment, each node (e.g., nodes 101, 102, 103, etc.) may be provided with a decentralized marketplace (not shown) where a participant may request a distributed application. For example, nodes 101, 102 and/or 103 may request and/or gain access to distributed applications 120, 121, 122, 123, and/or 124 via a decentralized marketplace. A decentralized marketplace may be, e.g., a network level application (or service, or have characteristics of both), and may be provided by the network operator as part of a suite of network level services and network level distributed applications.

A network operator of a decentralized P2P network may define standards, patterns, templates, application programming interfaces (APIs) etc., for use by network participants in designing and building distributed applications for the network. Such standards, patterns, templates, etc., may make network level services modular by at least partially standardizing distributed application design and development. For example, the network operator may define network level services with APIs exposing standard API calls for use by distributed applications. Further, templates of standardized parameters that may be used in distributed applications and with standard APIs may also be provided by the network operator.

In accordance with an embodiment a distributed notification service (e.g., notification service 111) may be a network level service of a decentralized P2P network. A distributed notification service (also referred to herein simply as a "notification" service) may manage, at the network layer, the sending and receiving of notifications to and from distributed applications. For example, a notification service executing on a node of a decentralized P2P network may listen for notifications meant for distributed applications also executing on the node, and may additionally be responsible for sending notifications from applications executing on the node.

A network operator may provide a template of parameters for use with a notification service (e.g., for use as parameters in API calls of the notification service). Network participants may develop distributed applications that incorporate the parameters in order to send and receive notifications associated with the distributed application through the notification service.

Table 1, below, lists exemplary parameters that may be used by a distributed notification service and distributed applications using the notification service for delivery and receipt of notifications on a decentralized P2P network.

TABLE 1

| Category | Name | M/O | Value/Description |
|---|---|---|---|
| Application | Application Name | M | Name of the application for which the notification is being defined. |
| Notification ID | Notification ID | M | ID of the notification |
| Notification Details | Title | M | Title of the Notification to be displayed on the the screen. |
| | Details | M | Details about the notification to be displayed on the the screen. |
| Notification Roles | Roles & Entitlements | M | Roles and Entitlements of the user who would receive this notification. |
| Notification Template | Channel | M | Communication Channel for the notification. |
| | Header | M | Title of the notification while sending it out. |
| | Message | M | Core content of the notification when sending it out. |
| | Archival Policy | M | No. of days after which the notification would be archived. |
| Notification Preferences | Type | O | Type of the notification. |
| | Priority | O | Priority of the notification. |
| | Email | O | Will the notification be emailed? |
| | Email Lock | O | Can the email notification settings be changed? |
| | Web | O | Will the notification be sent as a web notification? |
| | Web Lock | O | Can the web notification settings be changed? |

Table 1 includes parameter categories, parameter names, whether the parameter is mandatory or optional (shown as the "M/O" column in Table 1), and a value/description of the parameter. The Notification Preferences category of Table 1 includes notification channels by which a notification may be delivered, such as via an electronic mail (specified as "Email" in Table 1) system or via a web browser activity feed (specified as "Web" in Table 1). Other exemplary delivery channels include delivery via text or SMS (Short Message Service) messages, via social media platforms, or other suitable delivery channels as is necessary or desired. The "Web Lock and "Email Lock" entries in Table 1 refer to administrative restrictions on the Web and Email delivery channels, respectively. That is, the Web and Email channels may be activated or deactivated and then locked by, e.g., an admin participant such that participants with less rights than the admin participant cannot autonomously reconfigure these channel settings.

A distributed application may include a catalog of notification definitions. Each notification definition may be defined in terms of standard parameters (e.g., the parameters listed in Table 1, or other parameters) provided for a notification service by a network operator. A distributed application may be configured to employ the notification service, on behalf of the distributed application, to send and receive notifications to and from, respectively, peer nodes that also execute the distributed application.

In accordance with embodiments, the notification service of a node may be configured to send notifications from distributed applications executing on the node. Distributed applications may be configured to generate a notification using predefined templates and forward the notification to the network notification service. For example, a distributed application may generate a notification when a predefined event (also referred to herein as a "trigger" event) happens within the distributed application and may send the notification to the network notification service. In an exemplary embodiment, the distributed application may generate a notification based on a trigger event defined by business logic in the distributed application. The application may then call a method exposed by the notification service's API that excepts the notification parameters that define the notification as parameters of the exposed method. After receipt of the parameters defining the notification, the network notification service may, in turn, broadcast the notification to every node on the decentralized P2P network.

In accordance with embodiments, the notification service executing on other nodes of the decentralized P2P network may be listening for notifications that have been broadcast over the network. In an exemplary embodiment, the notification service may receive every broadcast notification sent across the network. Node network layer logic may determine notification traffic based on data in packet headers received by a network interface of a node and forward the traffic to the notification service to process. Upon receiving a broadcasted notification, the service may determine, based on its configuration, whether to forward the notification via available channels to the appropriate application (e.g., a local instance of the sending application) or whether to disregard the notification.

Figure 2:
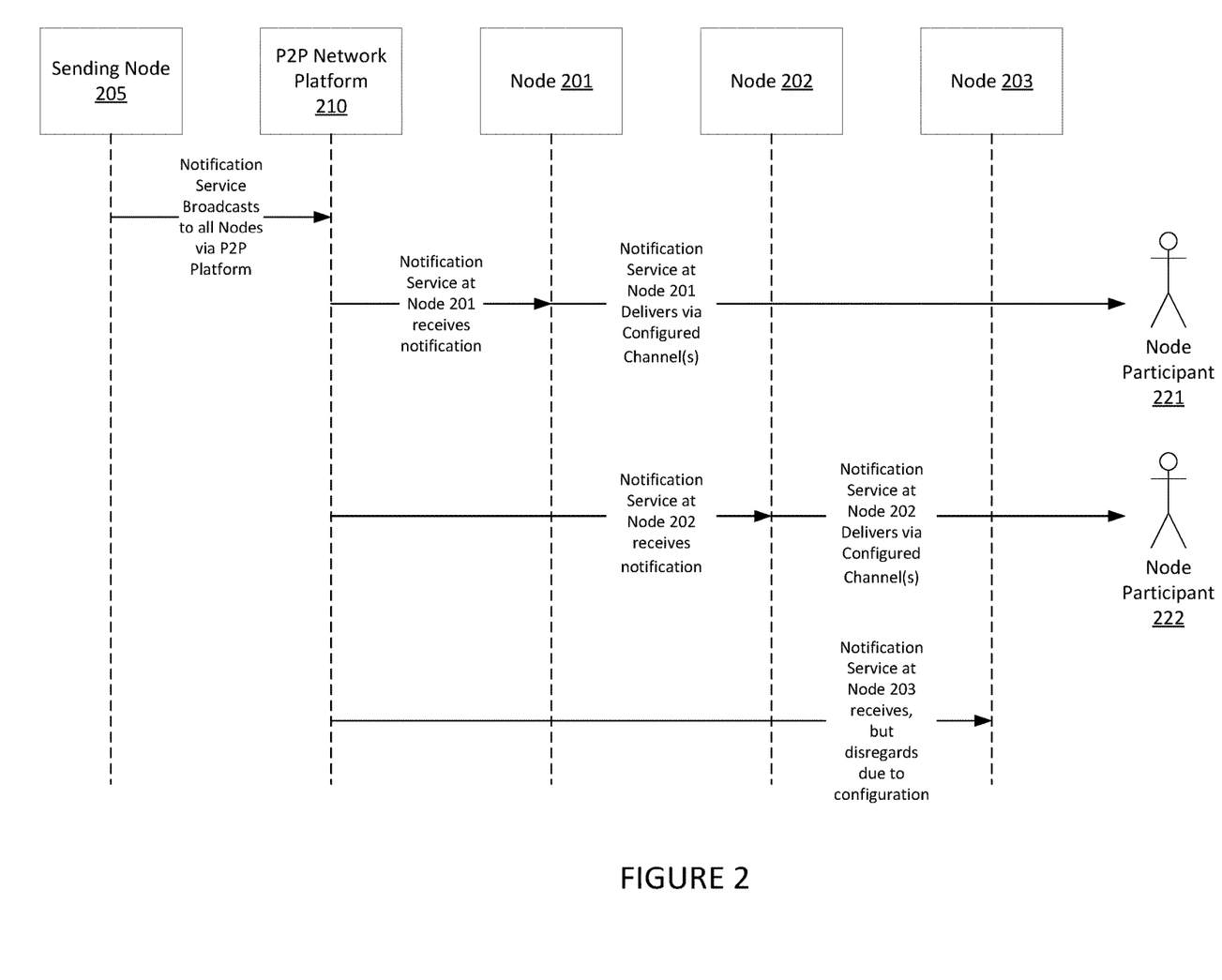
FIG. 2 is a sequence diagram of distributed notification delivery, in accordance with embodiments.

FIG. 2 is a sequence diagram of distributed notification delivery, in accordance with embodiments. Sending node 205, and nodes 201, 202, and 203 depict nodes of a decentralized P2P network. Sending node 205 and nodes 201, 202, and 203 may execute network-level services, including a network-level notification service. Sending node 205 may further execute a distributed application. The distributed application may be configured to generate a notification when an event happens within the application and send the event to the notification service for, e.g., broadcast distribution over the decentralized network.

In accordance with embodiments, the notification service executing on nodes 201, 202, and 203 may be listening for notification messages broadcast on the decentralized network. The notification service of nodes 201, 202, and 203 may each receive and evaluate the notification broadcast over the network by sending node 205. Nodes 201, 202, and 203 may evaluate the received notification message based on the value of parameters included in the message.

For example, node 201 and 202 may evaluate the message to determine that the message was generated by an instance of a distributed application that node 201 and 202 also execute an instance of. The notification service may use, e.g., the value of the received notification's "Application Name" parameter to determine this. The notification service may further determine to forward the notification to a user of the distributed application in accordance with notification settings configured by participant users of the application (e.g., by admin participant users and other participant users as the applicable rights hierarchy permits). Accordingly, the notification service of nodes 201 and 202 may deliver the received notification to node participants 221 and 222.

Node 203 may also receive the broadcast notification, but may determine, based on configuration, to disregard the received notification. For instance, node 203 may not execute an instance of the application that generated the massage. Alternatively, node 203 may execute an instance of the application that generated the notification, but participants have configured the notification service of node 203 not to deliver notifications of the type received to any node participants. Accordingly, node 203 may disregard the received notification by taking no further action.

Administrative ("admin") participants (e.g., participants with elevated configuration rights and/or privileges at a node, and responsible for configuring node-level settings and permissions for other node participants) may configure the distributed notification service to forwarded received notifications to node participants based on different factors. Exemplary factors may include distributed application usage, a participant's position within an organization, or any other factors as necessary or desired. Notification service settings may be configured by an administrative participant at a group level, at an individual level, at an application level, etc.

Further, node participants that do not have administrative rights or privileges may also configure notification service settings for themselves. Participant-made configuration settings may be subject to admin participant settings. That is, admin participant settings may take priority over participant settings. A notification service configuration interface may facilitate an admin participant locking notification settings so that they may not be changed by participants with less rights than the admin participant.

In accordance with embodiments, a distributed application may be a network-level application and may execute on every node in the decentralized P2P network. The network level application may be provided by the platform operator. The network-level application may generate and broadcast notifications using a notification service as described herein. Notifications generated by a network level application may not be configurable at the node level by admin participants of a node. For instance, a network level application may generate, and a notification service may broadcast, network level notifications to nodes. Such notifications may include subject matter such as network maintenance operations, network downtime, new nodes on the network, new application version releases, etc. Network level notifications may be mandatory in the sense that at least one node participant receives the network level notifications (e.g., an admin participant), and that some or all participants may not be able to opt out of receiving such notifications through configuration of the notification service.

Figure 3:
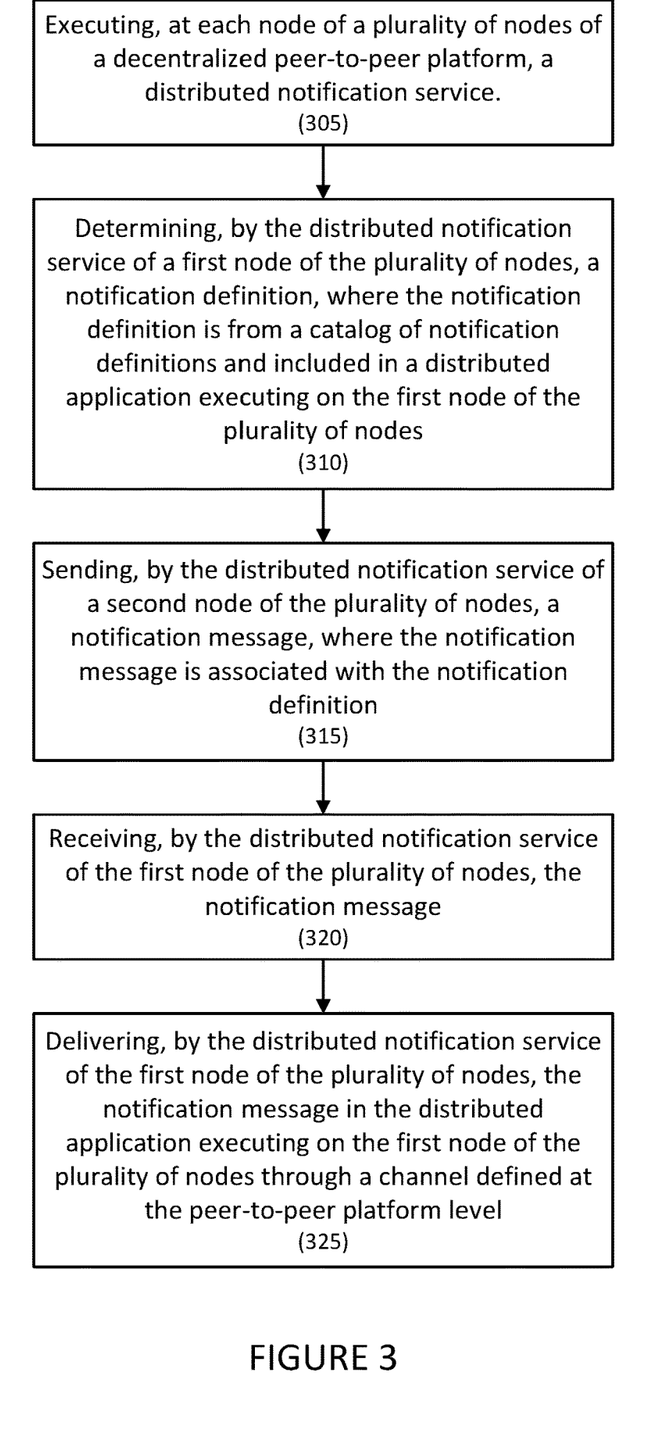
FIG. 3 is a flow chart for facilitating distributed notification delivery, in accordance with embodiments.

FIG. 3 is a flow chart for facilitating distributed notification delivery, in accordance with embodiments.

At step 305, each node of a plurality of nodes of a decentralized peer-to-peer platform may execute a distributed notification service, as described herein.

At step 310, the distributed notification service of a first node of the plurality of nodes may determine a notification definition. The notification definition may be from a catalog of notification definitions that is included in a distributed application executing on the first node of the plurality of nodes. The notification definition may include parameters defined at the network level for the distributed notification service. The parameters may be in the form of a standardized template defined at the network level for the distributed notification service. The catalog of notification definitions may include all notifications defined for the distributed application.

At step 315, the distributed notification service of a second node of the plurality of nodes may send a notification message. The notification message may be associated with the notification definition, such that it may be determined by the notification service as being generated by the distributed application.

At step 320, the distributed notification service of the first node of the plurality of nodes, may receive the notification message and, determine that it was generated by an instance of the distributed application.

At step 325, the distributed notification service of the first node of the plurality of nodes, may deliver the notification message in the distributed application executing on the first node of the plurality of nodes through a channel defined at the peer-to-peer platform level. The channel may be a user-selectable configuration item in an interface of the notification service and may have been selected by a participant (e.g., an admin participant or another participant) of the first node.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention. The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

The invention claimed is:

1. A method comprising:
providing a distributed notification service configured to execute on each node of a plurality of nodes of a decentralized peer-to-peer platform;
determining, by the distributed notification service of a first node of the plurality of nodes, a notification definition, wherein the notification definition is from a catalog of notification definitions and included in a distributed application executing on the first node of the plurality of nodes;
broadcasting, by the distributed notification service of a second node of the plurality of nodes, a notification message to all nodes of the decentralized peer-to-peer platform, wherein the notification message is associated with the notification definition;
receiving, by the distributed notification service of the first node of the plurality of nodes, the notification message; and
delivering, by the distributed notification service of the first node of the plurality of nodes, the notification message in the distributed application executing on the first node of the plurality of nodes through a channel defined at a network level of the decentralized peer-to-peer platform.

2. The method of claim 1, wherein the notification definition conforms to a parameter template defined at the network level of the decentralized peer-to-peer platform.

3. The method of claim 2, wherein the parameter template includes one of a notification title, a name of a distributed application the notification message is being defined for, and a notification message identifier.

4. The method of claim 1, wherein the channel is one of an electronic mail delivery and an activity feed delivery.

5. The method of claim 4, wherein the notification definition is determined based on a user selection from the catalog of notification definitions.

6. The method of claim 5, wherein the notification message is delivered to the channel based on a user selection of the channel.

7. The method of claim 1, wherein the distributed application is a platform level application.

8. The method of claim 7, wherein the distributed application is distributed from a platform operator to each node of the decentralized peer-to-peer platform.

9. The method of claim 8, wherein the notification message is a system level notification message.

10. The method of claim 1, wherein the decentralized peer-to-peer platform operates on a distributed ledger platform including a distributed ledger protocol.

11. A system for notification delivery on a decentralized peer-to-peer platform comprising:
a distributed notification service configured to execute on each node of a plurality of nodes of the decentralized peer-to-peer platform, wherein:
a first instance of the distributed notification service determines a notification definition, wherein the notification definition is from a catalog of notification definitions included in a distributed application executing on a first node of the plurality of nodes;
a second instance of the distributed notification service broadcasts a notification message to all nodes of the decentralized peer-to-peer platform, wherein the notification message is associated with the notification definition;
the first instance of the distributed notification service receives the notification message; and
the first instance of the distributed notification service delivers the notification message in the distributed application executing on the first node of the plurality of nodes through a channel defined at a network level of the decentralized peer-to-peer platform.

12. A non-transitory computer readable storage medium, including instructions stored thereon for delivering a notification on a decentralized peer-to-peer platform, which when read and executed by one or more computers cause the one or more computers to perform steps comprising:
determining, by a distributed notification service of a first node of a plurality of nodes of the decentralized peer-to-peer platform, a notification definition, wherein the notification definition is from a catalog of notification definitions and included in a distributed application executing on the first node of the plurality of nodes;

broadcasting, by the distributed notification service of a second node of the plurality of nodes, a notification message to all nodes of the decentralized peer-to-peer platform, wherein the notification message is associated with the notification definition;

receiving, by the distributed notification service of the first node of the plurality of nodes, the notification message; and delivering, by the distributed notification service of the first node of the plurality of nodes, the notification message in the distributed application executing on the first node of the plurality of nodes through a channel defined at a network level of the decentralized peer-to-peer platform.

13. The non-transitory computer readable storage medium of claim 12, wherein the notification definition conforms to a parameter template defined at the network level of the decentralized peer-to-peer platform.

14. The non-transitory computer readable storage medium of claim 13, wherein the parameter template includes one of a notification title, a name of a distributed application the notification is being defined for, and a notification message identifier.

15. The non-transitory computer readable storage medium of claim 12, wherein the channel is one of an electronic mail delivery and an activity feed delivery.

16. The non-transitory computer readable storage medium of claim 15, wherein the notification definition is determined based on a user selection from the catalog of notification definitions.

17. The non-transitory computer readable storage medium of claim 16, wherein the notification message is delivered to the channel based on a user selection of the channel.

18. The non-transitory computer readable storage medium of claim 12, wherein the distributed application is a platform level application.

19. The non-transitory computer readable storage medium of claim 18, wherein the distributed application is distributed from a platform operator to each node of the decentralized peer-to-peer platform.

20. The non-transitory computer readable storage medium of claim 12, wherein the decentralized peer-to-peer platform operates on a distributed ledger platform including a distributed ledger protocol.

* * * * *